United States Patent [19]

Hargis et al.

[11] Patent Number: 5,761,227

[45] Date of Patent: Jun. 2, 1998

[54] EFFICIENT FREQUENCY-CONVERTED LASER

[75] Inventors: David E. Hargis, La Jolla; Sven E. Nelte, Carlsbad, both of Calif.

[73] Assignee: Laser Power Corporation, San Diego, Calif.

[21] Appl. No.: 760,702

[22] Filed: Dec. 5, 1996

Related U.S. Application Data

[63] Continuation-in-part of Ser. No. 731,823, Oct. 21, 1996, which is a continuation of Ser. No. 295,006, Aug. 23, 1994, Pat. No. 5,574,740.

[51] Int. Cl.$^6$ .................................................... H01S 3/10
[52] U.S. Cl. ........................... 372/22; 372/92; 372/99
[58] Field of Search ........................... 372/22, 92, 99, 372/98, 107, 108

[56] References Cited

U.S. PATENT DOCUMENTS

| 4,791,631 | 12/1988 | Baumert et al. | 372/22 |
| 5,287,381 | 2/1994 | Hyuga et al. | 372/22 |
| 5,511,085 | 4/1996 | Marshall | 372/22 |

FOREIGN PATENT DOCUMENTS

| 0455383 | 11/1991 | European Pat. Off. | H01S 3/109 |
| A 4283977 | 10/1992 | Japan | H01S 3/094 |
| A 4291976 | 10/1992 | Japan | H01S 3/109 |

*Primary Examiner*—Leon Scott, Jr.
*Attorney, Agent, or Firm*—Knobbe, Martens, Olson & Bear, LLP

[57] ABSTRACT

An intracavity frequency-converted laser having an intracavity reflector situated to reflect converted radiation at a nonzero angle with respect to the optical axis. The laser includes an optical cavity that defines an optical axis, a gain medium for providing a fundamental laser emission, a pump source for pumping the gain medium, and a nonlinear material for frequency converting the fundamental laser emission to provide first and second converted beams that propagate in opposite directions within the optical cavity. An angled reflector that reflects optical radiation at the converted wavelength, but is transmissive at the fundamental wavelength is situated within the optical cavity to reflect one of the converted beams along a path angled with respect to the optical axis. Advantageously, reflecting the converted radiation before it propagates through the gain medium avoids absorption losses. Furthermore, interference between the reflected beam and other converted beam is avoided due to the angle of reflection. In one embodiment, the gain medium comprises an Nd$^{3+}$ doped material, the laser is designed to lase on the $^4F_{3/2} \rightarrow {}^4I_{9/2}$ transition at about 870–960 nm, and a nonlinear crystal is situated to frequency-double the emission of the gain medium to produce blue light at about 435–480 nm.

55 Claims, 5 Drawing Sheets

EFFICIENT FREQUENCY-CONVERTED LASER

This is a continuation-in-part of application Ser. No. 08/731,823, filed on Oct. 21, 1996, which is a continuation of application Ser. No. 08/295,006 filed on Aug. 23, 1994 now U.S. Pat. No. 5,574,740, which was issued Nov. 12, 1996, both of which are incorporated by reference herein.

BACKGROUND

1. Field of the Invention

This invention relates generally to lasers, and more specifically to intracavity frequency conversion in lasers.

2. Discussion of Related Art

A considerable amount of laser research has been directed toward frequency conversion (also known as "wavelength conversion"), which is a process in which laser radiation at one (and sometimes more than one) wavelength is converted to a second wavelength using a nonlinear material. A high conversion efficiency is advantageous for a number of reasons, including reduced energy consumption and reduced waste heat production.

Although conversion processes can be broadly defined to include any type of conversion from one wavelength to another, considerable attention has been directed to harmonic conversion, and specifically second harmonic generation (hereinafter referred to as "SHG"). In a SHG process, a fundamental laser frequency is doubled so that the converted frequency is twice that of the fundamental. In terms of wavelength, frequency doubling means that the converted wavelength is one-half the fundamental wavelength.

Although frequency conversion processes can be useful for any type of laser, there is considerable interest in developing frequency-converted solid-state laser devices, with particular emphasis on increasing efficiency of the conversion process and developing converted light sources emitting red, green or blue. One type of solid-state laser that has attracted particular interest is the microlaser, which comprises a short element of solid-state gain medium pumped by a laser diode. Typically, the solid-state gain medium includes a rare-earth ion such as trivalent neodymium ($Nd^{3+}$) or a transition metal ion such as chromium ($Cr^{3+}$ or $Cr^{4+}$) doped into a suitable host material. The most studied gain medium is $Nd^{3+}$-doped yttrium aluminum garnet (Nd:YAG), which has been diode laser-pumped and has been made to lase at 1342 nm, 1064 nm and 946 nm. Zayhowski, "Microchip Lasers," *The Lincoln Laboratory Journal*, Vol. 3, No. 3, pp. 427–445 (1990), discloses single-frequency microchip lasers using a miniature, monolithic, flat-flat, solid-state cavity that has longitudinal mode spacing greater than the gain bandwidth of the gain medium. These microchip lasers are longitudinally pumped with the close-coupled, unfocused output of a laser diode to generate near-infrared radiation. Mooradian, in U.S. Pat. No. 4,860,304, discloses a microlaser employing a Nd:YAG gain medium having a cavity length less than 700 µm.

The near-infrared radiation can be converted to the visible portion of the spectrum via an SHG process, using a nonlinear crystal for frequency doubling. Since the SHG conversion efficiency is a function of the fundamental laser beam intensity, the nonlinear crystal can be placed inside the cavity of a low power continuous wave laser to benefit from the high intracavity fundamental beam intensity. The conversion of optical radiation at one frequency into optical radiation of another frequency using a nonlinear optical material within an optical cavity is disclosed in numerous references. Byer et al., in U.S. Pat. Nos. 4,739,507 and 4,731,787, disclose a diode-pumped laser having a harmonic generator. In U.S. Pat. No. 4,809,291, Byer describes a diode-pumped solid-state laser that is frequency doubled to produce blue light. Byer also discusses the same subject in the article "Diode Laser-Pumped Solid-State Lasers," *Science*, Vol. 239, p. 745 (1988). Mooradian, in U.S. Pat. No. 4,953,166, discloses a solid-state gain material bonded to a nonlinear crystal, and dielectric reflective coatings deposited directly to the gain medium and nonlinear crystal surfaces to form a composite cavity intracavity doubled laser. To provide single frequency operation, Mooradian teaches selecting the cavity length such that the frequency separation of the cavity modes is substantially equal to or larger than the gain bandwidth.

A common nonlinear crystal used for intracavity frequency doubling is $KTiOPO_4$ (KTP). Radiation at 532-nm with as much as a few watts of power has been obtained in this way with a longitudinally oriented, diode laser pumped Nd:YAG laser. At 473 nm, an output power of 4 mW has been reported using $KNbO_3$ (potassium niobate) as an intracavity SHG crystal in combination with Nd:YAG lasing at 946 nm [Risk et al., Appl. Phys. Lett. 54 (17), 1625 (1989)]. However, diode laser pumped blue-green lasers based on intracavity SHG of Nd:YAG are limited in efficiency and stability due to the unpolarized fundamental emission, and the relatively weak, narrow diode absorption features of Nd:YAG.

In a standard linear laser cavity, lasing oscillation at the fundamental frequency can be described by two intracavity waves: a forward wave propagating from the input (back) mirror toward the output (front) mirror, and a backward wave propagating in the opposite direction (that is, toward the back mirror). In an intracavity frequency-converted laser, the gain medium is usually situated near the back mirror and the nonlinear material is situated within the optical cavity nearest to the front mirror. The forward-propagating fundamental wave generates a forward-propagating frequency-converted wave in the nonlinear material that exits the linear cavity though the output reflector, which is coated for high transmission at the converted wavelength.

In such an intracavity frequency-converted laser, the backward-propagating fundamental wave also generates a frequency-converted beam, but propagating in the backward direction. In one conventional linear cavity configuration, a reflective surface is formed on the back mirror so that the backward-propagating frequency-converted beam propagates through the gain medium, is reflected by the back mirror, and then again propagates through the gain medium and exits the cavity collinearly with the forward-propagating frequency-converted beam. Unfortunately, this backward-propagating beam can encounter several different loss mechanisms that may cause power losses: absorption by the gain medium, dephasing between the fundamental and converted beams, and depolarization of the converted beam as it propagates through the gain medium. For example, the gain medium can act as an absorber at the wavelength of the converted beam, causing losses to the converted beam and unwanted heating of the gain medium; specifically, in some intracavity frequency doubled lasers operating in the blue using $Nd^{3+}$-doped gain media, the converted blue radiation can be absorbed by excited ions at the $^4F_{3/2}$ level which is the upper laser level and thus exciting the ion to the conduction band. As a result of depopulation of the upper laser level, the population inversion is reduced and therefore the efficiency drops. Another disadvantage is that unavoidable heating during operation can cause the gain medium to develop a strong thermal lens. which can unfortunately cause significant optical aberrations to the converted beam as it propagates through the gain medium and is reflected from the back mirror. When the reflected beam recombines with the forward-propagating beam. the aberrations in the reflected beam can adversely interact with the forward-propagating beam. significantly reducing beam quality.

In order to avoid propagating the converted beam back into the gain medium. Byer et al.. in U.S. Pat. No. 4,809,291, referencing U.S. Pat. No. 4,578,793 issued Mar. 25, 1986, discloses a dual-resonator configuration in which the gain medium is disposed in a first ring resonator and the nonlinear material is disposed in a second ring resonator. Byer discloses that the dual-resonator configuration provides a single mode output and improved amplitude stability due to decoupling the doubling process from the lasing process because power is not reflected from the second resonator back into the first resonator (column 5, lines 26-31). However, it is well known that harmonic conversion employing the double cavity configuration is very difficult to achieve in practice, because the two cavities must be frequency locked to each other.

An intracavity-doubled laser is described by Marshall in U.S. Pat. No. 5,511,085, entitled "Passively Stabilized Intracavity Doubling Laser." Marshall discloses several embodiments. including an intracavity frequency-doubled laser in a linear configuration that generates both a forward- and a backward-propagating frequency-doubled beam. In some embodiments described by Marshall, a linear cavity laser includes an intracavity frequency-selective mirror placed between the laser crystal and the nonlinear frequency-doubling crystal. the intracavity mirror being highly reflective at the doubled frequency but transmissive at the fundamental. The intracavity mirror reflects the backward pass of frequency-doubled light directly back through the nonlinear crystal at 180° so that both the forward frequency-doubled beam and the backward frequency-doubled beam exit the cavity overlapped as a single beam propagating in an identical direction.

Unfortunately. contrary to the teaching by Marshall, reflecting the converted beam directly back along the beam path. collinear with the forward-propagating converted beam. has been found to adversely affect the efficiency and stability of the conversion process. particularly at high power levels. It is believed that the combined power of the two converted beams within the nonlinear material (that is, the forward-propagating converted beam and the reflected converted beam) can cause unwanted heating in the nonlinear material and lead to increased absorption at the fundamental wavelength and cause a corresponding loss of efficiency of the conversion process.

Furthermore. unless very tight tolerances are placed on the cavity length, and unless these tolerances can be maintained throughout the range of operating temperatures (an unlikely possibility), optical interference effects between the reflected frequency-converted beam and the forward-propagating frequency-converted beam usually lead to undesirable output power amplitude fluctuations due to the unavoidable phase difference between the two beams. In the conventional linear cavity configuration discussed above, these time-varying interference effects are avoided because the backward converted beam is reflected back from the input reflector of the main cavity, which is necessarily at a node for the fundamental wave that defines a fixed phase relationship of the converted beam with respect to the fundamental wave, and therefore defines a fixed phase relationship with the forward-propagating converted beam within the nonlinear material that does not vary with time. In other words, the phase relationship between the reflected converted beam and the forward-propagating converted beam can be less than optimal, which reduces frequency-converted power.

SUMMARY OF THE INVENTION

An objective of the invention is to provide a stable, efficient intracavity frequency-converted laser. The laser includes an optical cavity for laser radiation and a gain medium situated within the optical cavity for lasing along the optical axis of the optical cavity. A pump source is provided for pumping the gain medium sufficiently to excite a laser emission. A nonlinear material is situated within the optical cavity for frequency converting the laser emission to a converted wavelength. The frequency-converted radiation defines two counter-propagating beams: a first converted beam propagating in a first direction along the optical axis and a second converted beam propagating in a second, opposite direction along the optical axis An angled reflector is situated within the optical cavity to reflect one of the counter-propagating converted beams at a predefined non-zero angle with respect to the optical axis to provide a reflected converted beam.

Because the angled reflector causes one of the counter-propagating converted beams to reflect at an angle, the two converted beams (that is, the angled reflected beam and the other converted beam) exit the laser cavity with an angle between them. Preferably the angle of reflection is chosen to be small, but enough to avoid optical interference effects between the two beams. In some embodiments, the angle of reflection may be chosen so that the reflected beam propagates through the nonlinear material without significantly overlapping with the other converted beam, whereas in other embodiments the angle may be large enough to avoid propagating the reflected beam through the nonlinear material, for example a 45° angle of reflection would allow the reflected beam to exit the optical cavity at a 90° angle with respect to the optical axis. With this configuration, all of the forward- and backward-converted radiation is output from the laser cavity without power instabilities. After exiting the laser cavity, the two beams can be recombined in order to provide a full power single beam that has nearly the full power of the combined forward-propagating and reverse-propagating converted beams. Alternatively, the two beams can be imaged to a single spot by a focusing means such as a lens.

In one embodiment, a blue microlaser implemented according to the invention is stable and efficient. Furthermore, the blue microlaser can be designed to operate at room temperature or elevated temperatures. The blue laser comprises a laser cavity, a neodymium doped gain medium disposed in the laser cavity having a fundamental emission on the $^4F_{3/2} \rightarrow {}^4I_{9/2}$ transition at about 870–960 nm, a pump source for pumping the gain medium, a nonlinear material situated within the optical cavity for frequency-doubling the emission of the gain medium to the blue at about 435–480 nm, and an angled reflector situated between the gain medium and the nonlinear material to substantially reflect the backward propagating converted beam at a nonzero angle with respect to the optical axis. The angled reflector is highly transmissive for the fundamental emission at about 870–960 nm. In some embodiments, the angled reflector is directly deposited to the nonlinear material or to the gain medium. The angled reflector allows output from the cavity of substantially all the power in the forward and backward propagating frequency-converted beams without the deleterious effects caused by overlapping the two beams. For example, stability of the converted output is greatly enhanced (that is, power fluctuations are drastically reduced) because the reflected converted beam is directed off the optical axis and therefore cannot significantly interfere with the forward-propagating conversion process. Also, the converted beam is not allowed to enter the gain medium where it would otherwise be at least partially absorbed, hence losing optical power and heating the gain medium.

Furthermore, by deflecting the reflected converted beam at an angle with respect to the optical axis instead of along the optical axis, the total intensity of the converted beams is reduced within the nonlinear material, thus leading to enhanced performance when using nonlinear materials whose absorption at one wavelength increases under high intensities of another wavelength. For example, $KNbO_3$ exhibits blue induced infrared absorption, so that converted (blue) radiation at high intensities increases absorption of the fundamental (infrared) radiation, thereby reducing efficiency of the laser.

In some embodiments, intracavity etalons are used to provide spectral narrowing (i.e. tuning) of the fundamental wavelength to provide for efficient frequency conversion. Such spectral narrowing/tuning can be very useful because the spectral width of the fundamental emission spectrum is often wider than the spectral acceptance of the nonlinear material.

BRIEF DESCRIPTION OF THE DRAWINGS

The objects, advantages, and features of this invention will be more clearly perceived from the following detailed description, when read in conjunction with the accompanying drawing, in which.

DETAILED DESCRIPTION OF THE PREFERRED EMBODIMENTS

While this invention is susceptible of having many different forms, described herein are specific exemplary embodiments of the invention. In this application, the terms "wavelength" or "λ" and "frequency" or "f" are used to characterize laser radiation. Wavelength is defined herein as the wavelength in free space, and therefore either term (i.e., either wavelength or frequency) uniquely characterizes the laser radiation due to the well-known relationship $\lambda f = c$, where c equals the speed of light in the medium (herein assumed to be free space).

Figure 1:
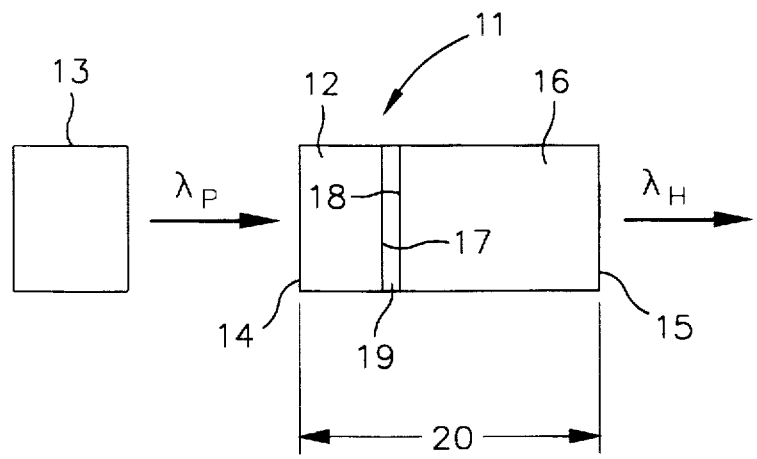
FIG. 1 is a schematic diagram of an intracavity-doubled solid-state laser disclosed in the parent application.

FIG. 1 is a diagram of a solid-state laser disclosed in the parent application Ser. No. 08/295,006. Laser 11 comprises a solid-state gain medium 12 having two opposite, flat polished faces, including input face 14 and interior face 17. The gain medium is optically pumped by a pump source 13, such as a laser diode, that is preferably matched with a suitable absorption band of the gain medium and having polarization aligned for maximum absorption. Gain medium 12 is made from a rare-earth doped gain medium such as $Nd:YVO_4$ or $Nd:GdVO_4$. A nonlinear material 16 has two opposite, flat polished faces including interior face 18 and output face 15. An optical cavity 20 is defined between input face 14 and output face 15 where both input face 14 and output face 15 are coated with a dielectric for high reflection at the fundamental wavelength. Additionally, input face 14 is coated for high reflection at the doubled frequency and output face 15 is coated for anti-reflection at the doubled frequency, and therefore the frequency-doubled radiation exits from output face 15. Interior faces 17 and 18 are coated for anti-reflection at both the fundamental wavelength and the converted wavelength.

In the laser disclosed in the parent application, the fundamental laser emission within the laser cavity can be described by two counter-propagating waves: a forward-propagating wave and a backward-propagating wave. Within the nonlinear crystal, the forward-propagating fundamental wave generates a forward-propagating frequency-doubled beam, and at the same time, the backward-propagating fundamental wave generates a frequency-doubled beam propagating in the backward direction. The forward-propagating frequency-doubled beam exits the linear cavity though the output reflector; however, the backward-propagating frequency-doubled beam first propagates through the gain medium along the optical axis, is reflected back along the optical axis, again propagates through the gain medium, and then propagates through the nonlinear material before exiting from the output face, still traveling along the optical axis.

It has been found that even greater efficiency and power output from the blue laser can be achieved by preventing the backward-propagating blue light from entering the gain medium, and by reflecting the backward-propagating blue light at a nonzero angle with respect to the optical axis so that does not propagate collinearly with the forward-generated converted beam through the nonlinear material. To better understand the advantages of preventing the doubled beam from propagating through the gain medium, an explanation of the energy absorption process in one laser medium, $Nd:YVO_4$, is set forth below as one example of absorption properties of gain media.

Figure 2:
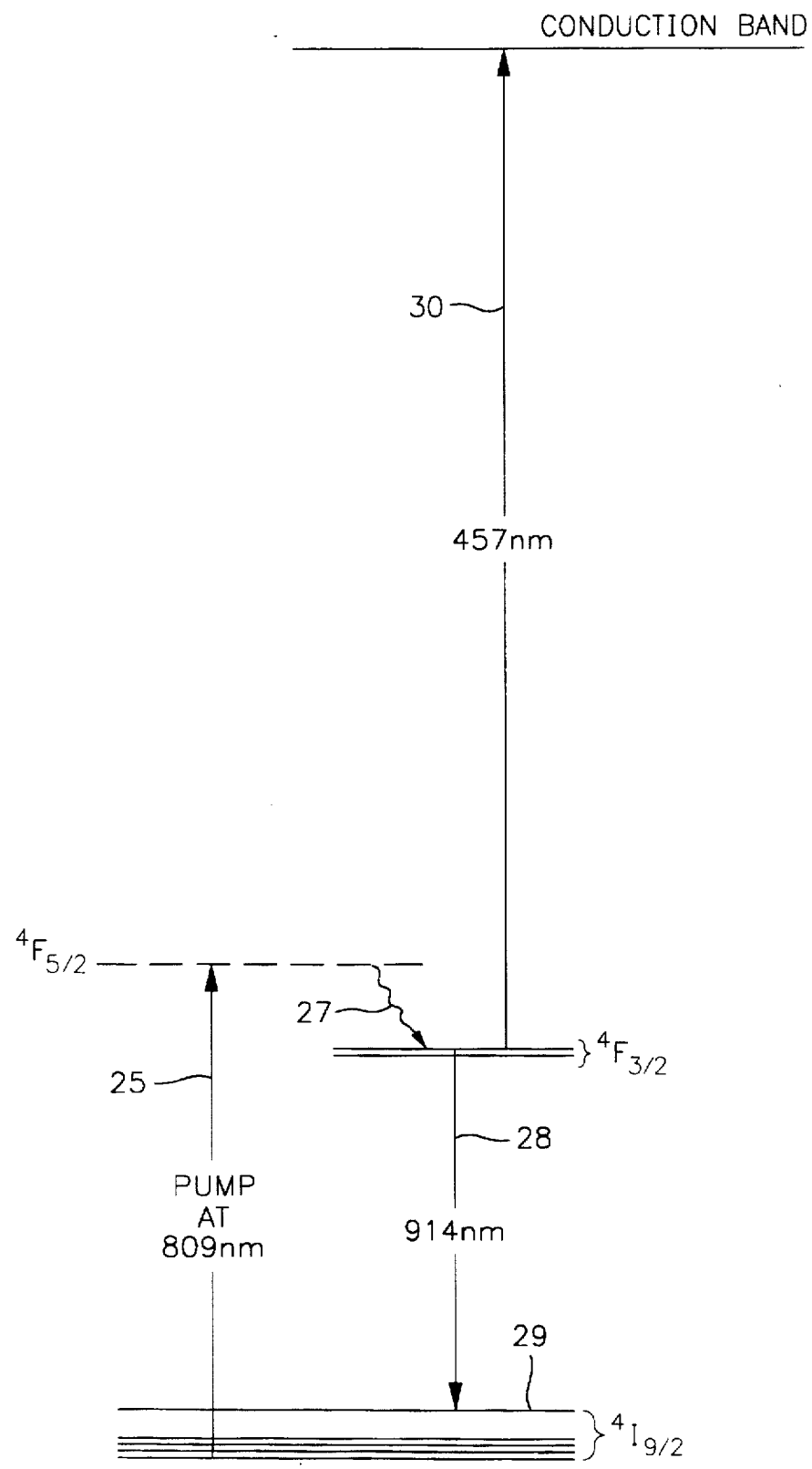
FIG. 2 is an energy level diagram of the $Nd^{3+}$ ion in $Nd:YVO_4$, showing a quasi-three-level laser.

FIG. 2 is a partial energy level diagram of energy transitions of the $Nd^{3+}$ ion in $Nd:YVO_4$ that are relevant to the $^4F_{3/2} \rightarrow {}^4I_{9/2}$ lasing transition. The energy states in the $^4I_{9/2}$ ground state and the $^4F_{3/2}$ level, which is the upper laser level, are sub-divided into Stark levels, illustrated as a series of parallel lines within each state. FIG. 2 shows an absorption transition 25 of the $Nd^{3+}$ ion from the ground state ($^4I_{9/2}$) to the pump state ($^4F_{5/2}$) at 809 nm. From the $^4F_{5/2}$ level, the ion relaxes via a transition 27 to the $^4F_{3/2}$ level, which is the desired upper laser level. For laser action at about 914 nm, the excited ion relaxes in a transition 28 from the $^4F_{3/2}$ level to the upper stark level 29 of the $^4I_{9/2}$ ground state manifold. However, another possible transition is an excited state absorption 30 from the $^4F_{3/2}$ level to the conduction band. Specifically, in the presence of high energy optical radiation, such as at 457 nm, the $Nd^{3+}$ ion may be excited to the conduction band where it can be converted to heat. Unfortunately, this excited state absorption de-populates the upper lasing level, leading to greatly reduced lasing efficiency at 914 nm, thus reducing the frequency-doubling efficiency at 457 nm.

Figure 3:
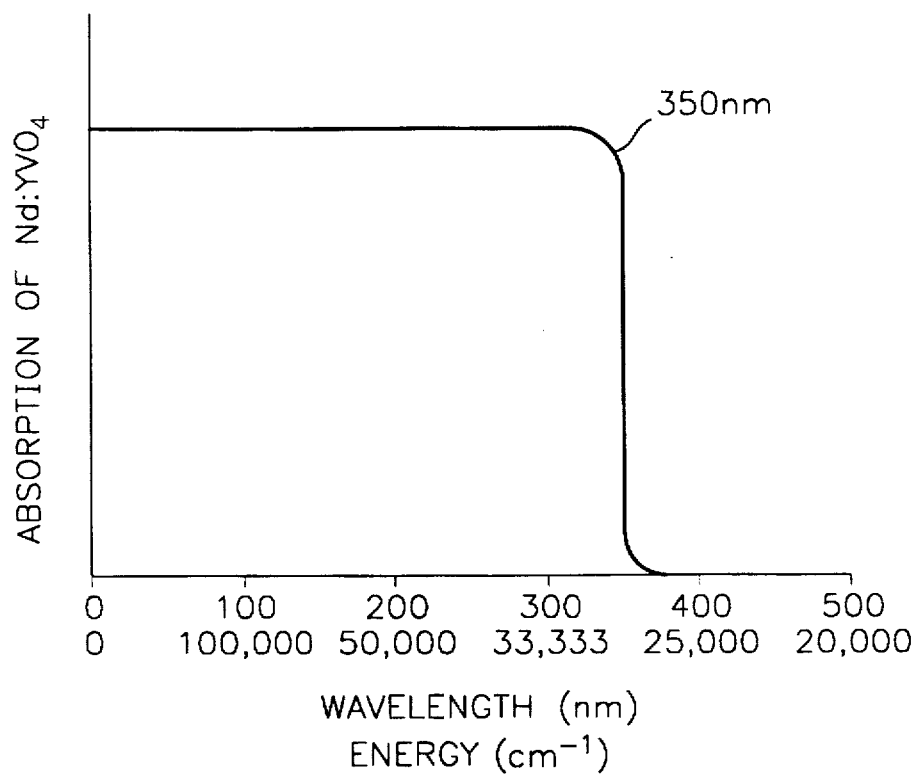
FIG. 3 is a graph of the absorption of $Nd:YVO_4$ as a function of wavelength, showing a band edge at about 350 nm.

FIG. 3 is a graph of the absorption spectrum of $Nd:YVO_4$, showing a high level of absorption for light with wavelengths less than about 350 nm, which corresponds to an energy of 28,600 $cm^{-1}$. Light absorption drops drastically for wavelengths longer than 350 nm, approximately corresponding to the minimum energy necessary to raise a $Nd^{3+}$ ion from the ground state to the conduction band. As described above, energy absorption can be a two-step process. The combined effective energy of an ion excited from the $^4F_{3/2}$ state (about 11,000 $cm^{-1}$) upon absorption of a 457 nm photon (about 22,000 $cm^{-1}$) corresponds to a wavelength of about 305 nm (about 33,000 $cm^{-1}$). Thus, it is apparent that an ion at the upper laser energy level ($^4F_{3/2}$) corresponding to 914 nm emission can absorb the doubled radiation at 457 nm, and be excited to the conduction band.

With reference to FIGS. 2 and 3, it can be shown that blue laser light entering the gain medium can interfere with efficient operation of the deep blue microlaser and reduce its output power. When the nonlinear crystal generates blue light, the backward propagating blue can be absorbed in the $Nd:YVO_4$ which depletes the upper laser level population by reducing the number of excited ions available for the $^4F_{3/2} \rightarrow {}^4I_{9/2}$ transition which, in turn, reduces the 914 nm intracavity power, thereby reducing blue light generation. This effect, when present, can significantly reduce the blue microlaser's efficiency. To circumvent this phenomenon and to increase the efficiency and output power of the blue microlaser, it is desirable to effectively prevent the generated blue light from propagating through the gain medium.

Another example of absorption in a solid-state gain medium is $Cr^{4+}:Mg_2SiO_4$ (Cr:forsterite), a gain material that is tunable between 1150 and 1400 nm. Unfortunately, the $Cr^{4+}$-doped forsterite is highly absorptive at red wavelengths, and if it were to be used as a gain medium for conversion to such red wavelengths, it would be useful to prevent the converted light from propagating back through the gain medium, in order to avoid losing converted energy to absorption and to prevent temperature buildup within the gain medium.

As another example, $Cr^{3+}:LiSrAlF_6$ (Cr:LiSAF) is a uniaxial laser crystal that is tunable between approximately 780 and 1000 nm. The characteristics of Cr:LiSAF were reported in Payne et al., "752 nm Wing-Pumped Cr:LiSAF Laser", IEEE Journal of Quantum Electronics, Vol. 28, No. 4 (April 1992), pages 1188–1196. Cr:LiSAF exhibits substantial absorption at blue wavelengths (about 400–500 nm) and if it were to be used as a gain medium for conversion to such blue wavelengths, it would be useful to prevent the converted light from propagating back through the gain medium for the reasons discussed above.

Figure 4:
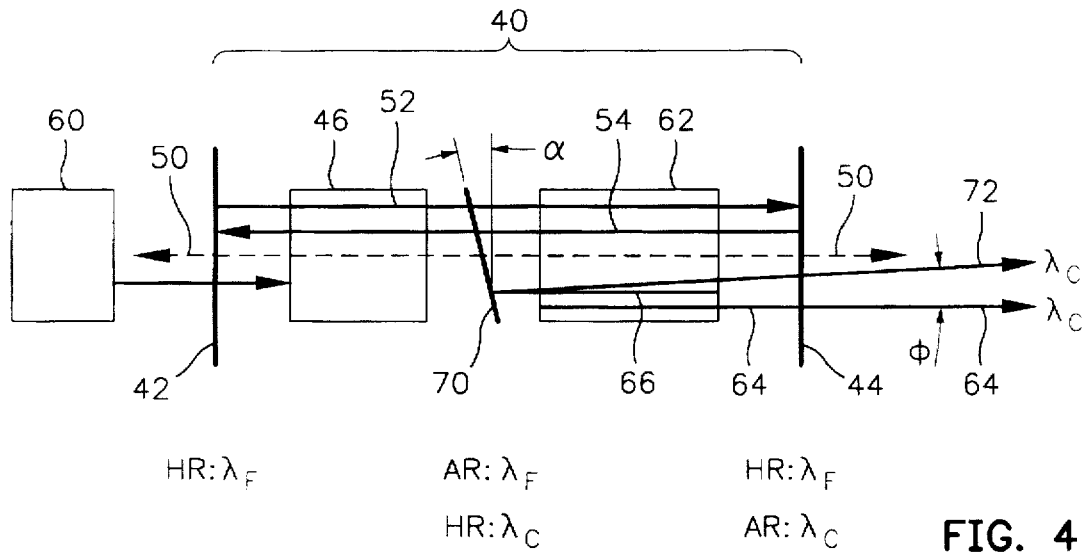
FIG. 4 is a diagram of an intracavity-converted laser including an angled reflector in an optical cavity having a linear configuration.

FIG. 4 is a conceptual diagram of an intracavity frequency-converted laser including an optical cavity 40 defined by an input (back) reflector 42 and an output (front) reflector 44 that define an optical axis 50. Both reflectors 42 and 44 are highly reflective at a fundamental wavelength $\lambda_f$. A gain medium 46 is situated within the optical cavity 40 so that it receives pump energy from a pump source 60, and responsive thereto provides a fundamental laser emission at the fundamental wavelength ($\lambda_f$), which causes a lasing oscillation within the optical cavity 40. The pump source 60 provides any form of pump energy, such as optical radiation or electrical energy, as suitable for the gain medium. For example, solid-state gain media may be pumped by optical radiation, and the pumping direction may longitudinal (i.e. along the optical axis of lasing) or from the side. The pump source 60 additionally may include a heat sink or other temperature regulation means to maintain proper operation.

The lasing oscillation within the optical cavity 40 is illustrated in FIG. 4 by arrows that represent a forward-propagating wave 52 and a backward-propagating wave 54. For purposes of illustration separate lines are used to show the optical axis, the lasing oscillation within the laser cavity, and the converted beams; however it will be apparent to one skilled in the art that in a real implementation these beams will overlap (with the exception of the beam reflected from the angled reflector, as described elsewhere herein).

A nonlinear material 62, preferably a nonlinear crystal, is situated within the optical cavity such that it converts the fundamental wavelength to a converted wavelength $\lambda_c$. As the forward-propagating wave 52 propagates through the nonlinear material, it generates a first converted beam 64 propagating in the forward direction. Similarly, as the backward-propagating wave 54 propagates through the nonlinear material, it generates a second converted beam 66 propagating in the reverse direction.

An angled reflector 70, is situated between the gain medium 46 and the nonlinear material 62, to reflect the backward-propagating second converted beam 66 before it enters the gain medium. The angled reflector 70 may comprise a separate optical component; however in a preferred embodiment, the angled reflector 70 is formed on the interior face of the nonlinear material, and in other embodiments the angled reflector may be formed on the interior surface of the gain medium. The angled reflector 70 is highly reflective at the converted wavelength $\lambda_c$ in order to substantially reflect the backward converted beam 66 at a predetermined angle to provide a reflected converted beam 72 while also being highly transmissive at the fundamental wavelength $\lambda_f$ in order to allow lasing oscillation of the fundamental laser emission with minimal loss. The angled reflector 70 defines an angle $\alpha$ with a plane orthogonal to the optical axis 50 and therefore the second converted beam 66 is reflected at an angle $2\alpha$ with respect to the optical axis 50. Upon exiting the laser, the reflected converted beam 72 and the first converted beam 64 have an angle $\phi$ between them, which may be equal to $2\alpha$ in embodiments having an angled reflector situated in an air space between the nonlinear material and the gain medium or on the interior surface of the gain medium, but in other embodiments, for example if the angled reflector is formed on the nonlinear material, the angle $\phi$ may vary from $2\alpha$ depending upon the index of refraction of the nonlinear material.

In alternative embodiments, the angle $\alpha$ may be made large enough that the reflected beam 72 exits that optical cavity without passing through the output reflector 44, which advantageously avoids any loss that may occur during propagation of the reflected beam through the output reflector. In other alternative embodiments, the angle α may be made large enough (for example 45°) that the reflected beam exits the cavity without passing through the nonlinear material 62 and the output reflector 44, which advantageously avoids any loss that may occur during propagation of the reflected beam through those two optical elements.

Figure 11:
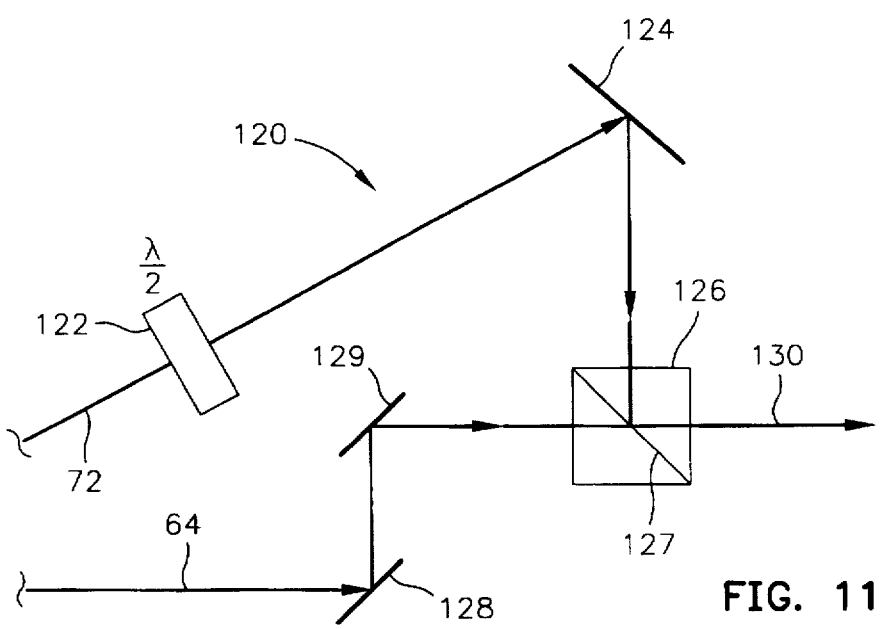
FIG. 11 is an embodiment of a beam combiner that provides a coherent output beam.
Figure 12:
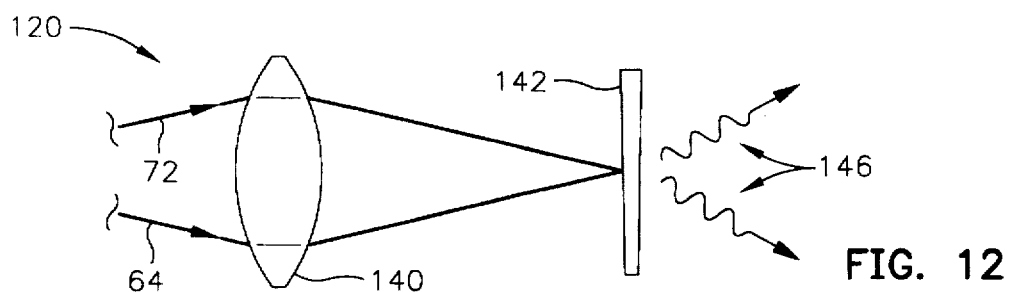
FIG. 12 is an embodiment of a beam combiner that provides a single point output.

The angled reflector 70, used in a frequency-converted laser, advantageously enhances the total output power of the laser, and permits substantially all of the frequency-converted light generated in the cavity to exit from the cavity. For example, the angle between the two beams can prevent interference effects which could otherwise cause power fluctuations. The two converted beams exiting the cavity can be combined by a relatively simple optical element or a combination of optical elements 120 into a single beam spot on a viewing surface, examples of which are shown in FIGS. 11 and 12, discussed subsequently.

While in some embodiments the input and output reflectors 42 and 44 are flat and parallel and therefore define a flat-flat cavity, in other embodiments the cavity may have alternative configurations. For example, the input and/or output reflectors 42 and 44 face may be convex, or one could be concave.

If the angled reflector is formed directly on the surface of the gain medium or nonlinear material, the optical axis will have a slight physical bend off the straight-line physical axis. This bend is caused by refraction of the fundamental beams at the angled surface. In order to compensate for this slight physical bend, one of the end mirrors may be tilted slightly with respect to a physical straight-line axis. The optical axis of the optical cavity is defined by the propagation of the fundamental laser emission, including any physical bend experienced during its propagation through the optical cavity. Selection of the proper angle for the end reflector can be determined by taking into account the angle of the reflector, the wavelength of the fundamental laser emission, and if appropriate, the index of refraction of the material comprising the angled reflector.

In some alternative embodiments (not shown), the gain medium may not be highly absorptive of the converted wavelength, so that it may be acceptable to allow the converted beam to propagate through the gain medium. In one such alternative embodiment, the angled reflector could be situated on the other side of the gain medium, for example between the input reflector 42 and the gain medium 46, so that the backward-propagating converted beam propagates through the gain medium before being reflected at an angle.

Figure 5:
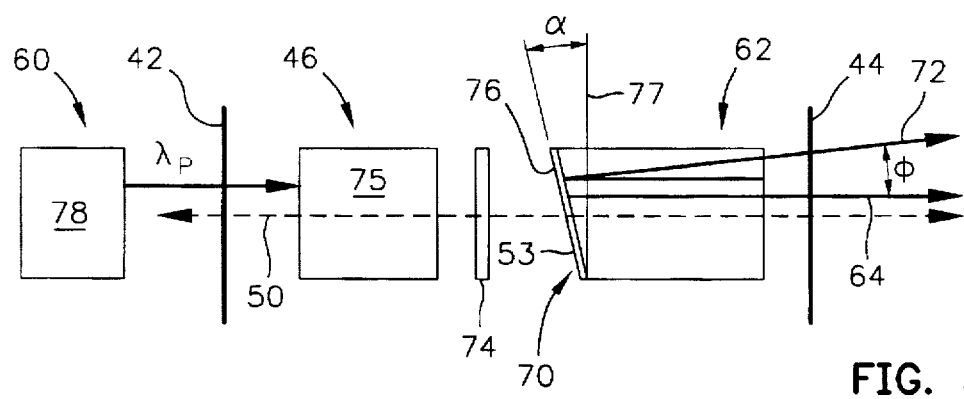
FIG. 5 is a schematic view of a longitudinally-pumped intracavity-converted solid-state laser in a linear configuration including an etalon and also including an angled reflector formed integral with the nonlinear material.

FIG. 5 is schematic view of an embodiment of an intracavity-converted laser including a spectral filter and an angled reflector 70 formed integral with a solid nonlinear material 62, such as a nonlinear crystal. Specifically, the nonlinear material has an interior-facing surface 73 that is angled with respect to the optical axis 50, and a coating 76 reflective of the converted wavelength is formed on the interior-facing surface 73. The surface 73, which defines the angle of reflection, makes an angle α with a plane 77 defined perpendicular to the optical axis 50.

In the embodiment of FIG. 5, the spectral filter comprises an etalon 74 situated within the optical cavity between the gain medium 46 and the nonlinear material 62. The spectral filter is particularly useful if the gain medium has a relatively wide emission spectrum at the lasing transition and the spectral acceptance of the frequency conversion process is smaller than the emission spectrum of the laser material. In that instance, the laser may have an unfortunate tendency to operate at a frequency that does not provide frequency conversion because the non-converting frequency may provide the lowest loss condition for the resonator, and in order to narrow the linewidth sufficiently to provide effective, efficient, and optimized frequency-converted lasing operation, a spectral filter is inserted within the optical cavity.

The term "etalon" generally refers to an optical element that has parallel faces. Preferably, the etalon is made of a material having a high index of refraction in order to provide a higher finesse and more off-resonance suppression. One suitable etalon material is undoped YAG, which has an index of refraction of 1.82, considered high compared with a conventional glass etalon having a relatively low refractive index of 1.50. In the embodiment of FIG. 5, the etalon 74 is inserted between the gain medium 46 and the nonlinear material 62, which is the preferred location, but in other embodiments the etalon could be situated anywhere within the optical cavity. Even though the etalon 74 is shown in the embodiment of FIG. 5, a spectral filter could be incorporated into any of the embodiments of this invention. For example if $Nd:YVO_4$ is used for a gain medium, the spectral filter may comprise $Nd:GdVO_4$, as described further in U.S. Pat. No. 5,574,740, issued Nov. 12, 1996.

Figure 6:
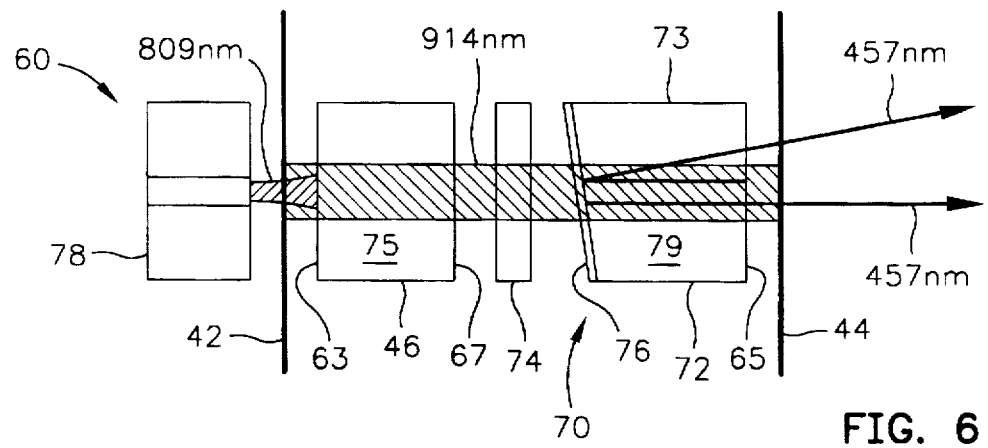
FIG. 6 is a schematic view of a diode-pumped intracavity-doubled solid-state laser in a linear cavity configuration, including an angled reflector situated between the gain medium and the nonlinear material.

Reference is now made to FIG. 6, which is a schematic diagram of a preferred embodiment of a frequency-converted laser. In the diode-pumped, frequency-converted microlaser of the preferred embodiment, the gain medium 46 comprises a solid-state gain medium 75 such as $Nd:YVO_4$ or $Nd:GdVO_4$ and the nonlinear material 62 comprises a nonlinear crystal 79 such as β-BBO (beta barium borate) or $KNbO_3$ (potassium niobate). The angled reflector 70 is formed on the interior face of the nonlinear crystal. The solid-state gain medium 75 is preferably a thin crystal (the term "thin" being defined as a slab no more than about 2 mm thick) whose faces have any suitable shape, such as an etalon (i.e. with parallel faces), a slight wedge shape, or one or two of the faces may comprise a curved surface. The gain crystal is oriented with respect to the nonlinear crystal 79 so that the polarization and propagation direction of the fundamental laser emission will be phase-matched for frequency doubling (that is, to halve the fundamental wavelength). The laser of the preferred embodiment is designed to operate on the $^4F_{3/2} \rightarrow {}^4I_{9/2}$ transition of $Nd^{3+}$, which generates a fundamental wavelength of about 912–916 nm and a converted wavelength of about 456–458 nm, which is blue light. It may be noted that the $^4F_{3/2} \rightarrow {}^4I_{9/2}$ transition is not as strong as other more well-known transitions such as 1064 and 1340 nm.

The pump source 60 comprises a laser diode 78 that produces optical pump radiation at a pump wavelength $\lambda_p$ (809 nm in the preferred embodiment) which is longitudinally applied (i.e. along an axis parallel to the optical axis) to the gain medium. The laser diode 78, may comprise a single stripe laser diode, a diode array, or a laser diode bar. Multiple laser diodes can be used to provide additional pump energy, such as for high energy uses. One highly suitable optical pumping source is at least one gallium aluminum arsenide (GaAlAs) laser diode that emits laser radiation at a wavelength matched with a suitable absorption band of the gain medium 75. Preferably, the laser diode's polarization is oriented with respect to the crystal axes of the laser medium for maximum absorption. For $Nd:YVO_4$ oriented so that one of its ordinary axes is parallel with the optical axis of the optical cavity, maximum absorption is obtained for pump light polarized parallel to the extraordinary axis. The laser diode may be attached to a heat sink to help maintain the laser diode pumping source at a constant temperature and thereby ensure optimal operation of the laser diode at a constant wavelength for efficient pumping. The heat sink may be passive, it may comprise a thermoelectric cooler, or it may comprise some other temperature regulation means to accomplish these purposes.

In the embodiment of FIG. 6, the output facet of the laser diode 78 is placed in a closely-coupled relationship (sometimes referred to as "butt-coupled" relationship) to the input face 63 of the solid-state gain medium without the use of a focusing means. As used herein, "closely-coupled" is defined to mean a coupling sufficiently close that a divergent beam of optical pumping radiation emanating from semiconductor light source 78 will optically pump a mode volume within the gain medium 75. In some embodiments, the laser diode may be coupled into a fiber-optic bundle whose output end is closely-coupled to the gain medium or imaged thereto using lenses.

In the preferred embodiment, the solid-state gain medium 75 comprises Nd:YVO$_4$, however other suitable solid-state materials include Nd$^{3+}$ doped crystals, such as Nd:GdVO$_4$, Nd:YAlO$_3$, Nd:YLiF$_4$ and Nd:YAG, Cr$^{3+}$ doped crystals such as Cr$^{3+}$:LiSrAlF$_6$ (Cr:LiSAF) and Cr$^{3+}$:LiCaAlF$_6$ (Cr:LiCAF) and Cr$^{4+}$ doped crystals, such as Cr$^{4+}$:Mg$_2$SiO$_4$ (Cr:forsterite) and Cr$^{4+}$:Ca$_2$GeO$_4$. Additionally, Nd$^{3+}$ doped glasses can be used. In preferred embodiments, the gain medium comprises an anisotropic crystal; that is, the crystal properties such as its index of refraction and/or its gain characteristics vary between two or three of its orthogonal crystal axes. For example, crystals exhibiting substantial anisotropic characteristics include Nd:YVO$_4$, Cr:LiSAF, and Cr:forsterite. The anisotropic crystal is situated within the optical cavity so that the crystal appears anisotropic to the laser emission, which means two of the orthogonal crystal axes that exhibit varying characteristics are situated perpendicular to the optical axis.

For Nd:YVO$_4$ in the preferred embodiment, the fundamental laser emission is on the $^4F_{3/2} \rightarrow {}^4I_{9/2}$ transition centered at about 914 nm, and this fundamental laser emission is doubled to about 457 nm. In order to provide an optical cavity for the fundamental laser emission and high loss at the other, stronger gain lines of Nd:YVO$_4$ (1064 nm and 1340 nm), the end reflectors 42 and 44 of the laser cavity have a high reflectivity at about 914 nm and a low reflectivity at about 1064 nm and 1340 nm. Additionally, the input reflector 42 is coated for high transmission at the pump wavelength (809 nm in the preferred embodiment) to transmit the wavelength of the laser diode pump beam, and the output reflector 44 is coated for high transmission at 457 nm, the doubled wavelength. The angled reflector 70 is coated for high transmission at 914 nm and high reflectivity at 457 nm.

In the preferred embodiment, the dopant concentration of neodymium in the Nd:YVO$_4$ crystal for lasing at about 914 nm ranges between 0.2 and 2.0%, depending upon the specific crystal lengths. The Nd$^{3+}$ dopant concentration-crystal length product is preferably chosen to maximize the efficiency of the blue laser device because the $^4F_{3/2} \rightarrow {}^4I_{9/2}$ transition is a quasi-three level system. Selecting the optimum dopant concentration-crystal length product enables most efficient operation of a quasi-three level laser system because it allows the pump efficiency to be optimized while minimizing unwanted re-absorption at the $^4I_{9/2} \rightarrow {}^4F_{3/2}$ transition. For Nd:YVO$_4$, the dopant concentration-crystal length product is within the range of 0.1 at. %-mm to 0.5 at. %-mm, depending upon the specific pump and cavity configurations. Particularly preferred with Nd:YVO$_4$ is a length (along the optical axis) of about 0.3 mm and a concentration of about 1.0 at. %. Due to higher absorption of pump radiation in Nd:GdVO$_4$, the dopant concentration can be reduced. For Nd:GdVO$_4$, the dopant concentration-crystal length product is within the range of 0.05 at. %-mm to 0.3 at. %-mm, depending upon the specific pump and cavity configurations. Particularly preferred with Nd:GdVO$_4$ is a gain medium having a length (along the optical axis) of about 0.25 to 0.3 mm and a concentration of about 0.5 to 0.7 at. %.

The preferred gain medium, Nd:YVO$_4$, (like and Cr:LiSAF) is a uniaxial gain crystal that defines a crystalline structure with three orthogonal axes: two ordinary axes (sometimes termed the "a" and "b" axes) that have approximately identical indices of refraction and an extraordinary axis (sometimes termed the "c" axis) that has an index of refraction substantially different from that of the ordinary axes. A uniaxial crystal is one type of "anisotropic crystal", a term which generally is used to define any crystal structure having indices of refraction or other properties that differ between one or more crystal axes. The three orthogonal axes in a crystal are sometimes termed "dielectric axes".

The uniaxial gain crystal is oriented within the optical cavity so that one of the ordinary crystal axes is collinear with the optical axis of the optical cavity. Furthermore, because the crystal's other ordinary axis and its extraordinary axis are orthogonal to the optical axis and to each other, the fundamental emission as it travels along the optical axis will see a substantial birefringence in the crystal—i.e. a refractive index for one polarization that is substantially different from the other. In other words, the uniaxial gain crystal is oriented within the optical cavity so that it is birefringent in a plane perpendicular to the direction of the optical axis, with one of the crystal axes (either the ordinary axis or the extraordinary axis) defining the selected polarization. Furthermore the gain characteristics along one axis are different than the other.

The anti-reflective coating on the interior surface (i.e. a surface within the resonator) of the gain crystal is designed for maximum transmission at the refractive index of the axis corresponding to a selected polarization (either the ordinary axis or the extraordinary axis), which decreases transmission (i.e. increases losses) for the non-selected polarization.

As a result of the relatively higher loss for radiation not having the selected polarization, lasing along the non-selected axis is suppressed in favor of the selected polarization. In Nd:YVO$_4$ the preferred polarization is selected to be in alignment with the extraordinary axis, although in other embodiments the polarization could be selected to be in alignment with the ordinary axis. Suppressing the non-selected polarization is very useful for efficient frequency conversion, which requires that the selected polarization be maintained. In conventional lasers, the losses introduced by frequency conversion can cause the fundamental laser emission to change polarization from the selected axis to the non-selected axis, in turn causing frequency conversion to saturate. Suppressing the non-selected polarization in this manner substantially reduces, or even eliminates, the tendency for the laser to change to the non-selected polarization during frequency conversion. If the gain crystal has two interior surfaces within the optical cavity instead of one, then the anti-reflective coating can be coated on both surfaces to provide even greater suppression of the non-selected polarization.

KNbO$_3$ and BBO are suitable nonlinear crystals for achieving a room-temperature Type-I phase match for the 914-nm line that lases polarized along a dielectric axis of the Nd:YVO$_4$. KNbO$_3$ and BBO also define a crystalline structure with three orthogonal axes. which are commonly termed the "a-axis". "b-axis" and "c-axis". KNbO$_3$ may be angle tuned or temperature tuned to achieve type I conversion from 914 nm to 457 nm. One possibility is to orient the crystal such that the polarization of the fundamental laser emission is aligned parallel with the a-b plane (i.e. the plane defined by the a- and b-axes of the nonlinear crystal) and the propagation direction (which follows the optical axis of the laser) is at about 44° from the b-axis toward the a-axis. Another possibility is to obtain Type I frequency conversion from 914 nm to 457 nm is by selecting the propagation direction to be parallel to the crystalline a-axis while the polarization of the fundamental laser emission is aligned with the b-axis. For this orientation the KNbO$_3$ crystal has to be maintained at a temperature of about 137° C. Yet another possible orientation of crystal structure requires the KNbO$_3$ crystal to be oriented such that the polarization of the fundamental laser emission is aligned parallel with the b-axis and the propagation direction is at about 24.3° from the a-axis toward the c-axis. For BBO. the crystal structure is oriented such that the polarization of the fundamental laser emission is aligned with the b-axis of the BBO and the propagation direction is at about 25.7° from the c-axis to the a-axis.

In the preferred embodiment. the input reflector 42 comprises a dielectric coating for high reflection ("HR") for the fundamental at about 914 nm. and for high transmission ("HT") at the pumping wavelength of about 809 nm. The output reflector 44 comprises a dielectric coating for high reflection at the fundamental wavelength of about 914 nm and for 1% to 20% anti-reflection ("AR") at the converted wavelength of about 457 nm. The interior face 67 of the gain medium 75 is coated for AR at about 914 nm. The angled reflector 70 is coated for AR at the fundamental wavelength and HR at the converted frequency. For the fundamental wavelength. the HR coatings have a reflectivity equal to or greater than about 99.5%. and the AR coatings have a reflectivity of about 0.25% or less. In order to suppress the higher gain emission of Nd:YVO$_4$ at 1064 nm and 1340 nm, so that these emission transitions do not compete with the desired emission at 914 nm. the coatings on opposite sides of the cavity (i.e.. input reflector 42 and output reflector 44) exhibit lower reflectance (for example. less than 50%) at 1064 nm and 1340 nm. The following Table I summarizes the reflectances for the preferred embodiment:

TABLE 1

| | REFLECTANCES | | | |
|---|---|---|---|---|
| Wavelength | Input Reflector 42 | Output Reflector 44 | Interior Surface 67 | Angled Reflector 70 |
| 809 | <5 | | | |
| 914 | ≥99.9 | ≥99.9 | ≤0.25 | ≤0.25 |
| 1064 | <10 | | <10 | <10 |
| 1340 | <50 | | <50 | <50 |
| 457 | | <5 | | >95 |

Figure 7:
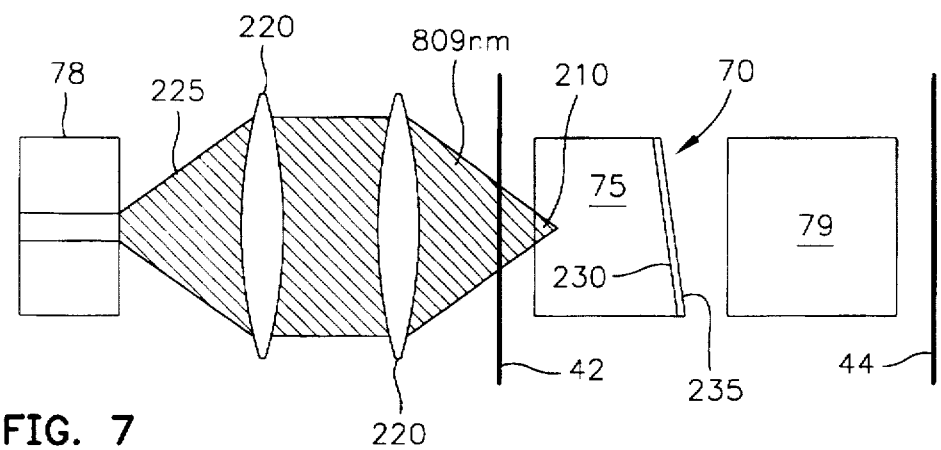
FIG. 7 is a schematic view of a intracavity-doubled solid-state laser in a linear cavity configuration that uses a lens system to focus optical radiation into the gain medium, and in which the angled reflector is formed on the interior surface of the gain medium.

FIG. 7 is a diagram of an embodiment that has been implemented for producing green light from solid-state gain medium 75. which preferably comprises Nd:YVO$_4$. In the embodiment that produces green light. the fundamental laser emission for the $^4F_{3/2} \to {}^4I_{11/2}$ transition is at about 1064 nm, and therefore the optical cavity. which is defined between the end reflectors 42 and 44. is designed with appropriate reflectivities for laser radiation at 1064 nm. The nonlinear crystal 79 is oriented for frequency doubling the fundamental laser emission to a wavelength of about 532 nm.

In FIG. 7. a focusing means or other imaging means. is used to focus the pump radiation from the laser diode 78 into a small area 210 within the gain medium 75. Specifically. the lenses 220 focus the diverging output 225 of the laser diode 78 into the gain medium. Focusing intensifies the pump radiation and greatly increases the photon-to-photon conversion efficiency in the gain medium 75. As an alternative to use of the illustrated lenses 220. other devices may be used to accomplishing the requisite focusing: for example. the focusing means can comprise a gradient index (e.g.. GRIN) lens. a ball lens. an aspheric lens. a combination of lenses. or a fiber-optic device.

In FIG. 7. the interior surface of the gain medium 75 comprises an angled surface 230 that comprises an angled reflector 70 for the converted backward-propagating beam. A dielectric coating 235 is formed on the angled surface that is highly transmissive at the fundamental laser emission. while being highly reflective at the converted wavelength.

Although the preferred embodiment of the green laser is shown in FIG. 7. other embodiments may utilize other configurations. For example. the configuration shown in FIG. 6 may be applied to make an effective green laser.

Figure 8:
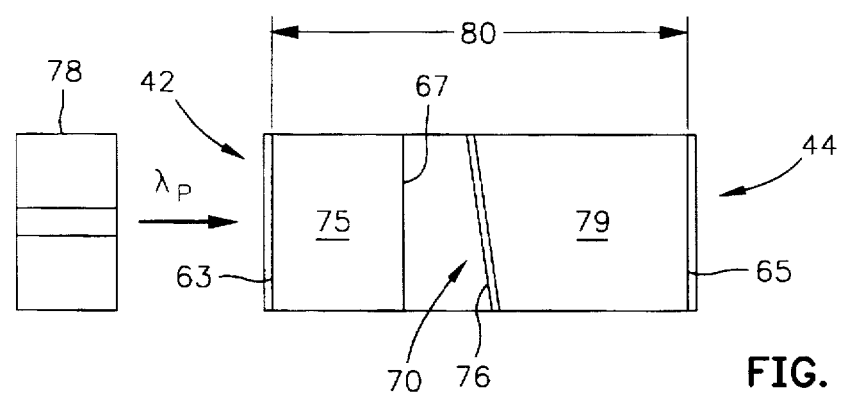
FIG. 8 is an embodiment of an intracavity-converted laser having a composite cavity with an angled reflector.

FIG. 8 is a diagram of an embodiment of an intracavity-converted solid-state laser having a composite cavity 80. Laser diode pump 78 supplies energy to solid-state gain medium 75 at the pumping wavelength $\lambda_p$ (809 nm. for example). which enters the laser crystal through input reflector 42. which includes a dielectric layer formed directly on the outwardly-oriented face 63 of the gain medium. The input reflector 44 includes a dielectric layer formed directly on the outwardly-oriented face 65 of the nonlinear crystal 79. The gain medium (preferably Nd:YVO$_4$) lases at 914 nm and doubles to 457 nm via nonlinear crystal 79. The backward-propagating 914 nm light within the nonlinear crystal also frequency doubles. and is reflected from highly reflective angled surface 70. As illustrated in FIG. 4. the reflected beam exits at an angle φ with respect to the forward-propagating converted beam because the angled reflector surface 70 is at a small angle α with respect to the optical axis of the composite cavity. This angle φ will be approximately 2α if the angled reflector is not one of the faces of the nonlinear material. However. if the angled reflector is formed on one of the faces. then the angle vary from 2α dependent upon the index of refraction of the nonlinear material. Alternatively. interior face 67 of the gain medium could be formed with the slope (angle α). which would also ensure that the two beams exit the laser at a slight angle with respect to each other. preventing interference between them. among other advantages. Angle α is preferably large enough to avoid such interference and the losses and amplitude instabilities that could otherwise result. It has been found that an angle for α of about 2° is normally sufficient. but it could be as small as about 0.5°. for example. If the angle is too small. the two beams could overlap to such an extent that the undesired instabilities mentioned above could occur. There is no technical limitation to larger angles. but for practical reasons it should be relatively small. that is. a few degrees.

In summary, the pumping diode light enters at the input reflector 42. causes lasing at about 914 nm within the composite cavity between reflectors 42 and 44. The intracavity nonlinear crystal gives rise to frequency doubling to about 457 nm which. because of the low reflectivity of output reflector 44 for the blue light (which can be as low as 0.1% to as high as 20%) is transmitted from the composite cavity as useful blue laser light.

Figure 9:
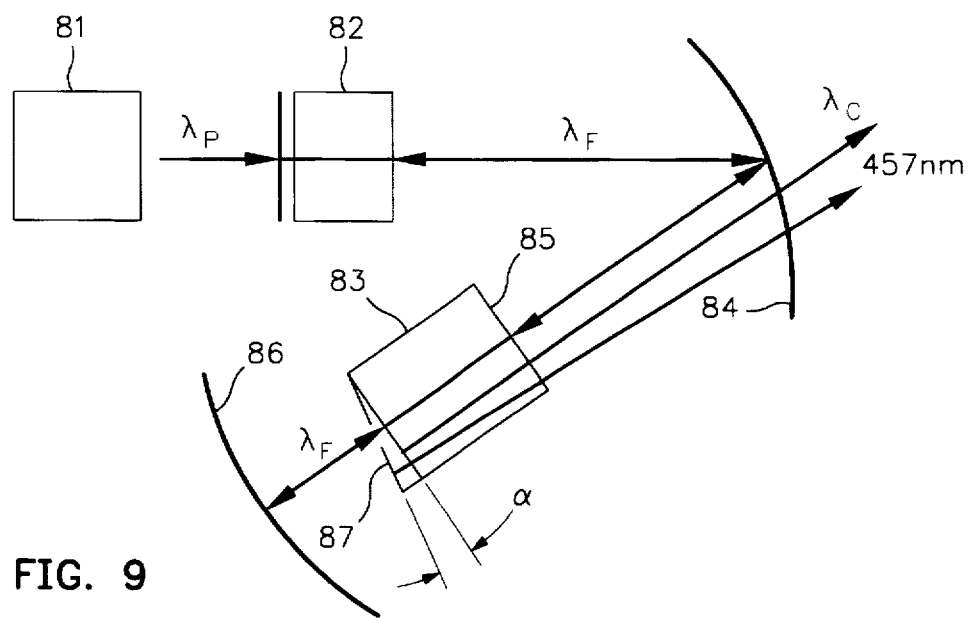
FIG. 9 is a schematic drawing of an embodiment of an intracavity-converted laser in a folded cavity configuration with a single folding mirror.

FIG. 9 is a diagram of another embodiment for avoiding the interference effects described above. This shows gain medium 82 and nonlinear material 83 in a laser cavity having a V-shaped configuration defined between first end mirror 87 and second mirror 86. Folding mirror 84 is situated within the laser cavity to reflect lasing radiation at the fundamental wavelength ($\lambda_f$) between the first and second end mirrors. Gain medium 82 is situated between first end mirror 87 and folding mirror 84. Nonlinear material 83 is situated between the folding mirror and second end mirror 86. In operation, laser diode pump 81 excites laser material 82 to produce the fundamental wavelength ($\lambda_f$). The reflective surface on folding mirror 84 is highly reflective at the fundamental wavelength ($\lambda_f$) and that beam is reflected through nonlinear crystal 83 where wavelength conversion to the converted wavelength ($\lambda_c$) occurs. However, the reflective surface of the folding mirror is anti-reflective at the converted wavelength ($\lambda_c$) so that the converted beam readily passes through and out of the laser cavity. Input face 85 of crystal 83 is anti-reflective at both ($\lambda_f$) and ($\lambda_c$) while end mirror 86 is highly reflective at 914 nm.

An angled reflector 87 is formed integral with nonlinear crystal 83, situated on the side closest to end mirror 86. The angled reflector is highly reflective at the converted wavelength $\lambda_c$ and highly transmissive at the fundamental wavelength, so that the converted beam is reflected at an angle and exits in a beam 88 through the folding mirror without affecting the fundamental. The folded cavity is advantageous because the mirrors can be designed to optimize the fundamental beam size in both the gain medium and the nonlinear crystal, in order to optimize frequency conversion. Particularly, the fundamental wave can be designed to have a small diameter in the gain medium and a small diameter in the nonlinear material, to provide greater intensity in the nonlinear material and therefore better conversion efficiency.

Figure 10:
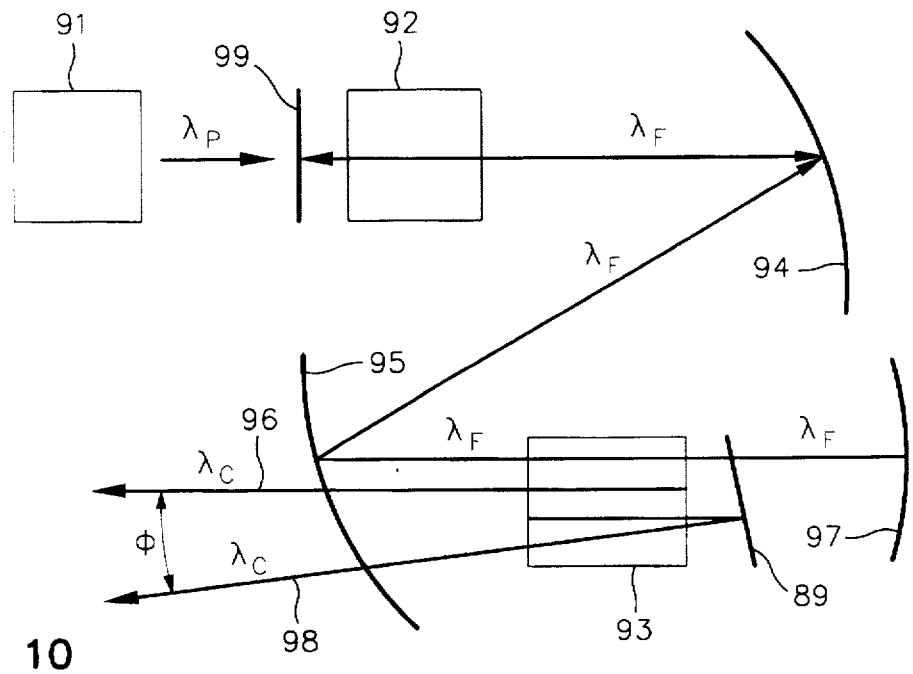
FIG. 10 is a schematic drawing of an embodiment of an intracavity-converted laser in a folded cavity configuration with two folding mirrors.

FIG. 10 is a diagram of a further alternative embodiment of a laser having an angled reflector in a double-folded configuration. Particularly, the laser of FIG. 10 has a Z-shaped cavity configuration defined between first end mirror 99 and second end mirror 97, which are highly reflective at the fundamental wavelength $\lambda_f$. A first folding mirror 94 and a second folding mirror 95, which are highly reflective at the fundamental wavelength $\lambda_f$, are situated within the laser cavity to reflect laser radiation between the first and second end mirrors. Gain medium 92 is situated in the optical path between first end mirror 99 and first folding mirror 94, and nonlinear material 93 is situated in the optical path between second folding mirror 95 and second end mirror 97 in a position for converting optical radiation at the fundamental wavelength $\lambda_f$ to a converted wavelength $\lambda_c$. Angled reflector 89, highly reflective at $\lambda_c$ but highly transmissive at $\lambda_f$, is situated between the nonlinear material and the second end mirror.

In operation of the embodiment of FIG. 10, pump source 91 excites gain medium 92 to generate laser radiation at the fundamental wavelength $\lambda_f$ which generates converted laser radiation at $\lambda_c$ in the nonlinear material. Two beams of converted laser radiation are generated, each propagating in an opposite direction. First converted beam 96 is allowed to exit directly through the second folding mirror, and second converted beam 98 is reflected from angled reflector 89 and also exits through the second folding mirror (but at an angle $2\alpha$) at an angle with respect to the optical axis after propagating through the nonlinear material 93. This angle will be approximately $2\alpha$ if the angled reflector 89 is not one of the faces of the nonlinear material. However, if the angled reflector 89 is formed on one of the faces, then the angle will vary from $2\alpha$ dependent upon the index of refraction of the nonlinear material.

FIGS. 11 and 12 are diagrams of two embodiments of beam combiner 120. In FIG. 11 the two beams are polarization combined. Reflected converted beam 72 is transmitted through ½ waveplate 122, which rotates its polarization by 90°. The beam is then reflected off mirror 124 toward polarization beamsplitter 126, where it is reflected from internal interface 127 within the beamsplitter. The first converted beam 64 is reflected off first mirror 128 and second mirror 129, and then transmitted through beamsplitter 126, and passes through interface 127. Thus, the two beams propagate collinearly to provide a combined beam 130. However, the polarization of the two beams is orthogonal, which should not pose a problem for many applications. In other embodiments, it should be apparent that first converted beam 64 and reflected beam 72 could be reversed with similar results.

FIG. 12 is an embodiment in which a lens 140 is used to image reflected converted beam 72 and first converted beam 64 to a single spot. One possible use is for illumination applications where diffuser 142 is situated at the image plane, and as a result the combined beams emerge from the diffuser in the form of a single illumination pattern, provided that the diffusion angle is greater than the angular separation of the two beams when they reach the diffuser.

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. Various changes may be made, materials substituted and separate features of the invention may be utilized. For example, the gain medium can comprise any suitable material, solid-state or otherwise, and the nonlinear material may comprise any suitable material. The precise geometric shape of the gain medium can be varied--the gain medium can be circular or rectangular in shape. If desired, the gain medium can be end-pumped by a fiber-optic coupled diode laser. The bonding of one element to another can be by optical contact, diffusion bonding, or by use of index matching fluid optical epoxies, among others. The angled reflector could comprise a curved shape, whether it is situated independently, or formed on the nonlinear material or the gain medium. The drawing figures are schematic only, intended to show element relationships, but not to depict specific sizes and shapes.

Furthermore, in some embodiments, the laser emission may comprise not just one wavelength but two wavelengths, and the nonlinear material may be situated for optically mixing the two wavelengths. For example, the laser disclosed in U.S. patent application Ser. No. 08/593,094, entitled "Single Cavity Solid State Laser with Intracavity Optical Frequency Mixing" and assigned to a common assignee, which is incorporated by reference herein, may be utilized to create counter-propagating first and second converted beams by optical mixing. Thus, it will be appreciated that various modifications, alternatives, and variations may be made without departing from the spirit and scope of the invention as defined in the appended claims. It is, of course, intended to cover by the appended claims all such modifications within the scope of the claims.

What is claimed is:

1. A method of intracavity frequency conversion in a laser comprising the steps of:
   a) pumping a gain medium situated within an optical cavity to provide a laser emission along an optical axis defined by the optical cavity;
   b) frequency converting the laser emission within the optical cavity to generate a first converted beam propagating in a first direction along the optical axis and a second converted beam propagating in a second, opposite direction along the optical axis; and
   c) reflecting said second converted beam at a predefined nonzero angle with respect to the optical axis to provide a reflected converted beam.

2. The method of claim 1 and further comprising the step of reflecting said second converted beam such that the reflected converted beam does not propagate through the gain medium.

3. The method of claim 1 wherein said reflecting step includes reflecting said second converted beam from an angled reflector situated within said optical cavity, said angled reflector being transmissive of the laser emission and reflective of the converted beam.

4. The method of claim 3, and further comprising the steps of:
   outputting said first converted beam from the optical cavity through an output reflector that is substantially transmissive of the converted beam and substantially reflective of the laser emission; and
   reflecting the second converted beam at an angle with respect to the first converted beam such that it exits the cavity through said output reflector.

5. The method of claim 1 wherein said pumping step comprises optically pumping a solid-state gain medium.

6. The method of claim 1, and further comprising the step of outputting the first converted beam and the reflected converted beam from the optical cavity, and imaging said beams to a common point.

7. The method of claim 1, and further comprising the step of re-combining said first and said reflected converted beams after said beams exit from the optical cavity, said re-combining causing said first and said reflected converted beams to overlap and propagate in a collinear direction.

8. A method of intracavity frequency conversion in a solid-state laser comprising the steps of:
   a) optically pumping a solid-state gain medium situated within an optical cavity to provide a fundamental laser emission along an optical axis defined by the optical cavity;
   b) frequency converting the fundamental laser emission in a nonlinear crystal within the optical cavity to generate a first converted beam propagating in a first direction along the optical axis and a second converted beam propagating in a second, opposite direction along the optical axis; and
   c) reflecting said second converted beam from an angled reflector situated within said optical cavity to provide a reflected converted beam propagating at a predefined nonzero angle with respect to the optical axis.

9. The method of claim 8 and further comprising the step of reflecting said second converted beam without propagating through the gain medium.

10. The method of claim 9 further comprising the step of propagating said reflected converted beam through said nonlinear material without substantially overlapping with said first converted beam.

11. The method of claim 9, and further comprising the steps of:
    outputting said first converted beam from the optical cavity through an output reflector that is substantially transmissive of the converted beam and substantially reflective of the fundamental laser emission; and
    reflecting the second converted beam at an angle with respect to the first converted beam such that it exits the cavity through said output reflector.

12. The method of claim 8 wherein said optical pumping step includes longitudinally pumping said solid-state gain medium with a laser diode.

13. A method of intracavity frequency conversion to produce blue light in a laser having an optical cavity that defines an optical axis, said method comprising the steps of:
    a) optically pumping an anisotropic neodymium-doped gain crystal in an longitudinal direction;
    b) generating a polarized fundamental laser emission in said gain crystal corresponding to the $^4F_{3/2} \to {}^4I_{9/2}$ laser transition, said gain crystal defining an ordinary axis and an extraordinary axis situated within said optical cavity in an orthogonal relationship to the optical axis so that the polarized fundamental laser emission propagates along the optical axis with a predetermined polarization aligned parallel with one of said ordinary and extraordinary axes;
    c) frequency doubling said polarized fundamental laser emission within said optical cavity in a nonlinear crystal to generate a first converted beam propagating in a first direction along the optical axis and a second converted beam propagating in a second, opposite direction along the optical axis; and
    d) reflecting said second converted beam from an angled reflector situated within said optical cavity to provide a reflected converted beam propagating at a predefined nonzero angle with respect to the optical axis.

14. The method of claim 13, wherein said gain crystal comprises Nd:YVO$_4$, said fundamental laser emission is generated at approximately 914 nm, and said frequency doubling step includes generating blue light at approximately 457 nm.

15. The method of claim 13, and further comprising the step of Type I phase matching.

16. The method of claim 13, wherein said optical pumping step includes longitudinally pumping said solid-state gain medium with a laser diode.

17. The method of claim 13, and further comprising the step of narrowing the linewidth of said fundamental laser emission by use of a spectral filter situated within the optical cavity.

18. The method of claim 13, and further comprising the step of propagating said reflected converted beam through said nonlinear material without substantially overlapping with said first converted beam.

19. The method of claim 13, and further comprising the steps of:
    outputting said first converted beam from the optical cavity through an output reflector that is substantially transmissive of the converted beams and substantially reflective of the fundamental laser emission; and
    reflecting the second converted beam at an angle with respect to the first converted beam such that it exits the cavity through said output reflector.

20. The method of claim 13, and further comprising the step of outputting the first converted beam and the reflected converted beam from the optical cavity, and imaging said beams to a common point.

21. The method of claim 13, and further comprising the step of re-combining said first and said reflected converted beams after said beams exit from the optical cavity, said re-combining causing said first and said reflected converted beams to overlap and propagate in a collinear direction.

22. A frequency-converted laser comprising:

an optical cavity that defines an optical axis;

a gain medium situated within said optical cavity;

a pump source for pumping said gain medium to excite a laser emission within the optical cavity;

a nonlinear material situated within the optical cavity for converting said laser emission to a converted wavelength; and an angled reflector situated within the optical cavity for reflecting optical radiation at the converted wavelength along a path at a nonzero angle with respects to the optical axis.

23. The laser of claim 22 wherein said angled reflector is situated between said gain medium and said nonlinear material.

24. The laser of claim 22, and further comprising a spectral filter positioned within the laser cavity.

25. The laser of claim 22, wherein the optical cavity has a linear configuration.

26. A solid-state frequency-converted laser comprising:

an optical cavity that defines an optical axis;

a solid-state gain medium situated within said optical cavity;

a pump source for optically pumping said gain medium to excite a fundamental laser emission at a fundamental wavelength within the optical cavity;

a nonlinear crystal situated within the optical cavity for converting the fundamental laser emission to a converted wavelength; and an angled reflector situated within the optical cavity for reflecting optical radiation at the converted wavelength along a path at a nonzero angle with respect to the optical axis.

27. The laser of claim 26 wherein said angled reflector is situated between said gain medium and said nonlinear material.

28. The laser of claim 26, wherein the gain medium is selected from a group consisting of: $Nd:YVO_4$, $Nd:GdVO_4$, $Nd:YAlO_3$, $Nd:YLiF_4$, $Nd:LSB$, $Cr:LiSAF$, $Cr:LiCAF$, $Cr^{4+}:Mg_2SiO_4$, and $Cr^{4+}:Ca_2GeO_4$.

29. The laser of claim 26, wherein the gain medium comprises a $Nd^{3+}$ doped laser crystal.

30. The laser of claim 29, wherein the laser cavity is designed to lase within the range of about 870–960 nm in order to lase on the $^4F_{3/2} \rightarrow {}^4I_{9/2}$ transition of $Nd^{3+}$.

31. The laser of claim 29, wherein the laser cavity is designed to lase at about 1064 nm in order to lase on the $^4F_{3/2} \rightarrow {}^4I_{11/2}$ transition of $Nd^{3+}$.

32. The laser of claim 26, wherein the gain medium comprises a $Cr^{4+}$ doped material designed to lase within a range between about 1150 and 1400 nm.

33. The laser of claim 26, wherein the gain medium comprises a $Cr^{3+}$ doped material designed to lase within a range between about 800 and 1000 nm.

34. The laser of claim 33 wherein said gain medium comprises Cr:LiSAF.

35. The laser of claim 26, wherein said pump source comprises a laser diode for longitudinally pumping said gain medium.

36. The laser of claim 26, wherein said gain medium comprises an anisotropic material having a first crystal axis and a second crystal axis situated orthogonal to the optical axis, said first crystal axis defining a predetermined polarization of the fundamental laser emission, said first crystal axis being aligned with respect to the nonlinear material in an orientation to provide a predetermined frequency conversion process.

37. The laser of claim 36 and further comprising an optical coating on said anisotropic gain medium that has greater transmissivity for said fundamental laser emission than for emission along said second crystal axis.

38. The laser of claim 26, wherein the optical cavity has a linear configuration.

39. A frequency-doubled laser comprising:

an optical cavity, said optical cavity defining an optical axis;

a gain medium including an anisotropic neodymium-doped crystal for generating a substantially polarized fundamental laser emission corresponding to the $^4F_{3/2} \rightarrow {}^4I_{9/2}$ laser transition, said crystal defining an ordinary axis and an extraordinary axis situated within said optical cavity in an orthogonal relationship to the optical axis so that the polarized fundamental laser emission propagates along the optical axis with a predetermined polarization aligned parallel to one of said ordinary axis and extraordinary axis;

an optical pump source situated to longitudinally pump said gain medium with optical radiation;

a nonlinear crystal situated within said optical cavity to frequency double the polarized fundamental emission to generate blue light; and an angled reflector situated within the optical cavity for reflecting optical radiation at said blue light along a path at a nonzero angle with respect to the optical axis.

40. The laser of claim 39, wherein said optical pump source comprises a laser diode.

41. The laser of claim 39, wherein said gain medium is selected from the group comprising $Nd:YVO_4$ and $Nd:GdVO_4$.

42. The laser of claim 41 wherein said gain medium comprises $Nd:YVO_4$ and has a dopant concentration-length product ranging between 0.1 at. %-mm and 0.5 at. %-mm and a length less than 2.0 mm.

43. The laser of claim 42 wherein said gain medium has a length along the optical axis of approximately 0.3 mm and a dopant concentration of approximately 1.0 at. %.

44. The laser of claim 41 wherein said gain medium comprises $Nd:GdVO_4$ and has a dopant concentration-length product ranging between 0.05 at. %-mm and 0.3 at. %-mm and a length less than 2.0 mm.

45. The laser of claim 39, wherein said nonlinear crystal is selected from a group comprising $KNbO_3$ and BBO.

46. The laser of claim 39, and further comprising a spectral filter situated within the optical cavity for narrowing the linewidth of said fundamental laser emission.

47. The laser of claim 39 wherein said angled reflector is situated between said gain medium and said nonlinear material.

48. The laser of claim 39, and further comprising a spectral filter positioned within the laser cavity.

49. The laser of claim 39, wherein the optical cavity has a linear configuration.

50. A frequency-converted laser comprising:

means for providing an optical cavity that defines an optical axis;

a gain medium situated within said optical cavity;

pump means for pumping said gain medium to provide a laser emission along the optical axis;

frequency-conversion means for frequency converting the laser emission within the optical cavity means to generate a first converted beam propagating in a first direction along the optical axis and a second converted beam propagating in a second, opposite direction along the optical axis; and reflector means for reflecting said second converted beam at a predefined nonzero angle with respect to the optical axis to provide a reflected converted beam.

51. The laser of claim 50, and further comprising means for reflecting said second converted beam such that the reflected converted beam does not propagate through the gain medium.

52. The laser of claim 50, and further comprising means for propagating said reflected converted beam through said frequency-conversion means without substantially overlapping with said first converted beam.

53. The laser of claim 50 wherein said reflector means includes an angled reflector situated within said optical cavity, said angled reflector being transmissive of the laser emission and reflective of the converted beam.

54. The laser of claim 50, and further comprising means for outputting the first converted beam and the reflected converted beam from the optical cavity, and means for imaging said beams to a common point.

55. The laser of claim 50, and further comprising a means for re-combining said first and said reflected converted beams after said beams exit from the optical cavity, so that said first and said reflected converted beams overlap and propagate in a collinear direction.

* * * * *